United States Patent [19]

Harris

[11] 3,945,336

[45] Mar. 23, 1976

[54] BICYCLE DISTANCE SAFETY DEVICE

[76] Inventor: Willie Harris, 1519 89th Ave., Oakland, Calif. 94621

[22] Filed: Jan. 22, 1975

[21] Appl. No.: 543,041

[52] U.S. Cl. .............. 116/28 R; 40/129 R; 280/289
[51] Int. Cl.² ........,.................. B62J 5/00; B62J 27/00
[58] Field of Search.......... 116/28 R, 173; 40/129 R, 40/129 C; 280/289; 248/223; 224/30

[56] References Cited
UNITED STATES PATENTS

| 702,003 | 6/1902 | Hannum | 280/289 |
|---|---|---|---|
| 3,438,651 | 4/1969 | Hertoghe et al. | 280/289 |
| 3,586,348 | 6/1971 | Rich, Jr. | 280/289 |
| 3,769,931 | 11/1973 | Babut et al. | 116/28 R |
| 3,788,268 | 1/1974 | Hiatt et al. | 116/28 R |
| 3,812,815 | 5/1974 | Kuenzel | 116/173 |

Primary Examiner—Richard C. Queisser
Assistant Examiner—Daniel M. Yasich
Attorney, Agent, or Firm—Theodore J. Bielen, Jr.; Richard Esty Peterson

[57] ABSTRACT

A bicycle safety device which indicates not only the presence of a bicycle but the minimum distance that should be maintained by other vehicles in passing the bicycle; the safety device includes a vertical member attachable at its bottom end to the frame of a bicycle and a horizontal member attached to, and cantilevered from, the top end of the vertical member, said horizontal member having a marker at its distal end to indicate the recommended minimum distance other vehicles should maintain from the bicycle when passing.

5 Claims, 4 Drawing Figures

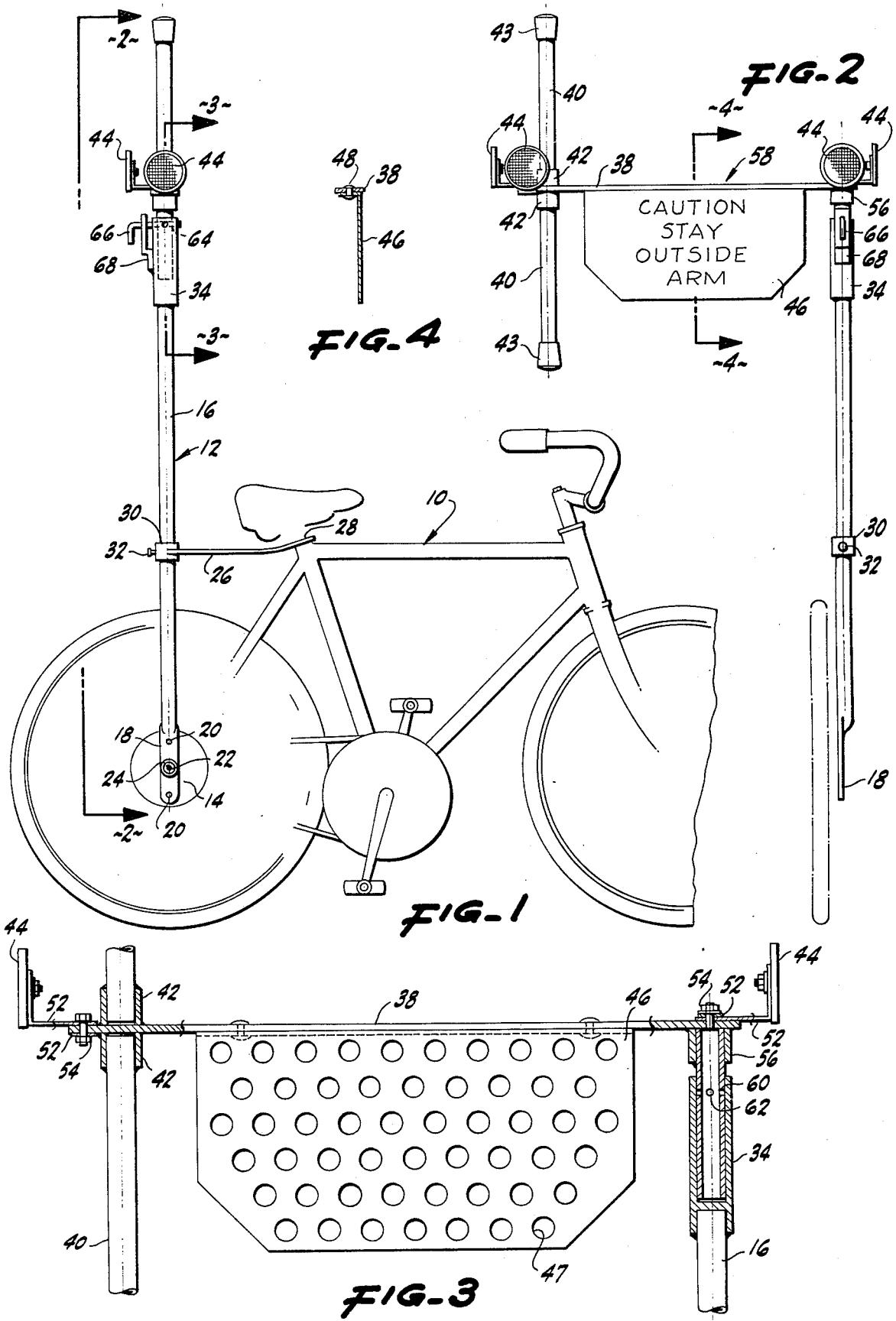

BICYCLE DISTANCE SAFETY DEVICE

BACKGROUND AND SUMMARY OF THE INVENTION

This invention relates to a safety device for bicycles for indicating the presence of bicyclists to motorists and, in particular, to a safety device that is attachable to the frame of a bicycle which includes both a vertical member to signal the presence of a bicyclist and a horizontal member outwardly extending from the side of the bicycle to designate the recommended minimum distance that should be maintained by motorists in passing the bicyclist.

It is a common experience that the low profile of bicyclists, particularly younger cyclists riding smaller than standard-sized bicycles, presents a problem to motorists who often fail to detect their presence. One common method of remedying this problem has been to attach an antenna-like wand to the rear portion of the bicycle frame. The antenna-like wand customarily includes a flag or pennant at its distal end to draw the attention of motorists to the presence of the cyclist. However, the rakish pennant device does not convey sufficient information which would adequately protect very young riders and, particularly, learners or novices who are inexperienced in handling a bicycle.

The use of a safety device which not only indicates the presence of a rider, but designates the suggested minimum distance from the rider that should be maintained by a passing motorist, has the added effect of altering the motorist to the apparent inexperience of the rider. The motorist will then naturally exert an unusual degree of caution when passing the cyclist.

The safety device of this invention comprises a vertical member having a lower end connectable to the frame of a bicycle. At an upper end of the vertical member is attached a cantilevered, horizontal cross member. The cross member has a length designating the very minimum distance that should be maintained between the bicyclist and a passing motorist. In the preferred embodiment, a second vertical segment is attached to the distal end of the cross member to clearly define the designated distance. The end of the vertical member and the horizontal cross member include reflectors to provide an adequate signal during evening or night use. Depending from the cross member of the preferred embodiment is an attachment plate to which a sign may be mounted with a cautionary message. These and other features will become apparent in the detailed description of the invention.

The principal members forming the safety device are fabricated from a lightweight material, such as aluminum, to insure that the safety device does not interfere with the balance of the bicycle to which it is attached.

BRIEF DESCRIPTION OF THE DRAWINGS

FIG. 1 is a side elevational view of the bicycle distance safety device attached to a bicycle.

FIG. 2 is a sectional view taken on the lines 2—2 of FIG. 1.

FIG. 3 is an enlarged cross-sectional view taken on the lines 3—3 of FIG. 1.

FIG. 4 is a cross-sectional view taken on the lines 4—4 of FIG. 2.

DETAILED DESCRIPTION OF THE PREFERRED EMBODIMENT

Referring to FIG. 1, a bicycle 10 is shown having the safety device 12 attached to the rear hub 14 of the bicycle. The safety device 12, shown also in FIG. 2, includes a tubular vertical member 16 having a flattened bottom end 18 with holes 20 for selective attachment of the vertical member to the axle stud 22 of the rear hub 14. The vertical member 16 is attached to the stud 22 through a center hole (not visible) and secured by the axle nut 24. Additional support is provided to the vertical member 16 by a brace 26. The brace simply comprises a flat element having a collar hole (not visible) at one end through which the seat stem 28 is inserted and a rim collar 30 at the other end which encircles the vertical member. The ring collar 30 includes a thumb screw 32 which locks the collar 30 to the vertical member.

Fixed to the top end of the vertical member is a tubular socket 34. Inserted in the socket 34 is a journal 36 which is affixed to the end of a horizontal cross member 38. At the distal end of the cantilevered cross member is attached vertical T-segments 40. The T-segments 40 are secured in sockets 42 at the end of the cross member 38, one segment extending a short length above the cross member and the other extending below the cross member. The ends of the T-segment are capped with rubber caps 43 to prevent damage to or from the ends of the tubular T-segment during careless operation or storage of the bicycle and safety device. Together, the cross member and T-segments clearly define the recommended minimum distance that should be maintained when passing a cyclist on the bicycle 10.

As an additional safety indicator, reflectors 44 are attached to both the distal end and anchored end of the cross member 38. The reflectors insure proper protection during nighttime riding. For young or novice riders, a warning sign 46 is attached to the cross member and depends therefrom. The warning sign contains a suitable warning such as "CAUTION, STAY OUTSIDE ARM." The warning sign 46 is attached to the cross member 38 by rivets 48, as shown in FIGS. 3 and 4.

Referring to FIG. 3, the construction of the various interconnected members is shown in greater detail. The reflectors 44 are mounted on brackets 52 and attached to the cross member 38 by threaded fasteners 54. The journal 36 is fixed at the end of the cross member in a collar brace 56 and downwardly projects for removable insertion in the socket 34 fixed at the top end of the vertical member. The journal 36 is pivoted in the journal in order that the safety arm 58, comprising the cross member and associated elements, may be positioned to either the left or right side of the bicycle depending on the cycling conditions. Further, the safety arm may be pivoted longitudinally along the overall length of the bicycle for convenient storage.

In order to lock the safety arm in the above described positions, two perpendicular holes 60 and 62, shown in FIG. 3, are drilled through the journal. By select alignment with a hole 64 through the socket 34, shown in dotted line in FIG. 1, the arm can be locked in position by insertion of a pin 66 through the aligned holes. The pin 66 is carried by a bracket 68 attached to the outside of the socket 34.

The construction of the safety arm is not entirely rigid. Since the cross member 38 is flat, the safety arm 58 is somewhat resilient, providing a bounce to the arm when riding which will attract the attention of a motorist. If desired, the sign may have perforations 70, as shown in FIG. 3, to reduce air resistance. Further, the sign may be brightly colored or coated with a reflective material dispensing with the warning caption.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A bicycle distance safety device attachable to bicycles for indicating a minimum safe distance to be maintained from inexperienced bicycle riders, comprising: an elongated vertical member having a top end and bottom end, said bottom end having an aperture therethrough and including means for attaching said vertical member to the rear portion of a bicycle frame with said top end extending substantially above the bicycle; over end of an arm member connected between the ends of said vertical member and the other end thereof connected to the bicycle; a cross member having a base end and distal end, said base end having means for attaching said cross member to the top end of said vertical member with said distal end horizontally extending outwardly from the side of said bicycle a predetermined distance indicating a minimum safe distance to be maintained from the bicycle; and, indicator means on the distal end of said cross member for indicating the recommended minimum distance to be maintained in passing a bicycle equipped with said safety device, said safety device being fabricated predominantly of a lightweight material to minimize interference of said safety device with the balance of the bicycle to which it is attached.

2. The bicycle distance safety device of claim 1 wherein said indicator means comprises a vertical member attached to the distal end of said cross member, said vertical member extending segmentally above and below said cross member.

3. The bicycle distance safety device of claim 2 wherein said indicator means comprises additionally at least one reflector on said cross arm.

4. The bicycle distance safety device of claim 2 wherein said cross arm includes a warning sign.

5. The bicycle distance safety device of claim 1 wherein said top end of said vertical member has a socket and said means for attaching said cross member to the top end of said vertical member comprises a journal insertable in said socket, said journal and socket having locking means for select positioning of said cross member with said vertical member.

* * * * *